United States Patent [19]
Waldie, Jr

[11] Patent Number: 5,088,228
[45] Date of Patent: Feb. 18, 1992

[54] RELEASABLE SINKER ASSEMBLY

[76] Inventor: Robert Waldie, Jr, 912 Sheridan Ave., Bexley, Ohio 43209

[21] Appl. No.: 587,108

[22] Filed: Sep. 24, 1990

[51] Int. Cl.⁵ .............................................. A01K 91/00
[52] U.S. Cl. ................................................... 43/43.12
[58] Field of Search ............... 43/43.12, 42.04, 44.92, 43/44.95, 44.96, 44.97

[56] References Cited

U.S. PATENT DOCUMENTS

| | | | |
|---|---|---|---|
| 3,081,575 | 3/1963 | Meisner | 43/43.12 |
| 3,125,790 | 3/1964 | Gayload | 43/43.12 |
| 3,180,052 | 4/1965 | Malesko | 43/43.12 |
| 3,267,899 | 8/1966 | Kimball | 43/43.12 |
| 3,744,177 | 7/1973 | Cron, Jr. | 43/43.12 |
| 4,177,599 | 12/1979 | Petterson | 43/43.12 |
| 4,926,580 | 5/1990 | Lin | 43/43.12 |

Primary Examiner—Kurt Rowan
Assistant Examiner—Chuck Y. Mah
Attorney, Agent, or Firm—Thomas S. Baker, Jr.

[57] ABSTRACT

A releasable sinker assembly includes a sinker having an opening and a spindle having a main body adapted to extend through the sinker opening, an enlarged base at one end of the spindle and attaching means for attaching the spindle to a fishing line at the other end of the body. The base is formed of an elastomeric material and is larger in size than the sinker opening. The sinker opening and the base are sized such that the base cannot pass freely through the opening when the base is in its free state but the base may be deformed and pulled through the opening when the sinker is held in place.

6 Claims, 1 Drawing Sheet

RELEASABLE SINKER ASSEMBLY

BACKGROUND OF THE INVENTION

Most still fishermen attach a sinker near the end of their line somewhat above a baited hook to provide enough weight to pull line off of a reel or spool and carry the baited hook to a desired depth below the surface of the water. Additionally, most bait casting fishermen attach a weight to the end of their line just above a baited hook or artificial bait to provide enough weight to pull the fishing line off of a reel or spool during the casting process. Oftentimes when either type of fishermen attempt to reel in their fishing line the sinker becomes caught on rock or debris below the surface of the water. Many times the sinker cannot be freed from its entanglement and the line must be cut causing loss of the sinker and of the hook or artificial lure attached to the end of the line.

Additionally, some times fishermen break the tips of fishing rods or cause other types of damage to equipment or drop things into the water accidentally when trying to free a fishing line having a snagged sinker.

Accordingly, it is desirable to provide a sinker assembly adapted to be used on a fishing line which will enable the fishing line to be freed if the sinker becomes caught with a minimum loss of tackle and with a minimum of effort.

SUMMARY OF THE INVENTION

The instant invention provides a releasable sinker assembly. The assembly comprises a sinker having an opening, a spindle having a main body adapted to extend through the opening in the sinker, an enlarged base at one end of the spindle and attaching means for attaching the spindle to a fishing line at the other end of the main body. The base of the spindle is formed of an elastomeric material and is larger than the sinker opening. The sinker opening and the spindle base are sized such that the base cannot pass freely through the opening when the base is in its free state but the base may be deformed and pulled through the opening when the sinker is held in place.

DESCRIPTION OF THE INVENTION

Figure 1:
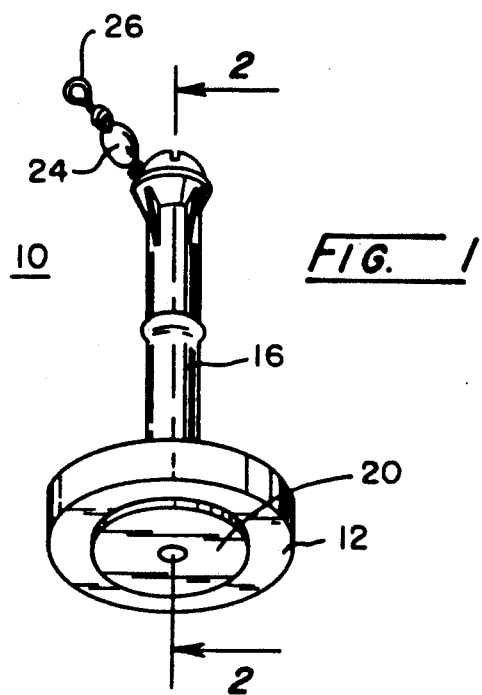
FIG. 1 is a perspective view of the sinker assembly of the present invention.
Figure 2:
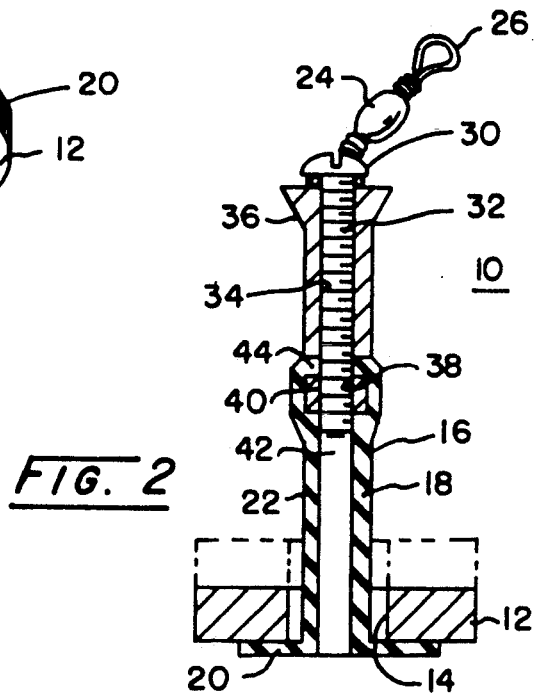
FIG. 2 is a view along line 2—2 of FIG. 1.

Turning to FIGS. 1 and 2 of the drawings, it may be seen that the releasable sinker assembly (10) of the present invention has a sinker or weight (12) with a central bore (14). Although sinker (12) has been shown as having a cylindrical shape, the size, weight and composition of sinker (12) may be varied to suit the demands of the individual fisherman. It is necessarily only that the sinker (12) have a bore to receive other elements of the assembly as will be described hereinbelow. It has been found that the sinker (12) may be punched out of a structural steel member containing less than two percent (2%) lead. Because lead has been found to be detrimental to animals and marine life, utilization of such a material for the sinker (12) is preferred.

Sinker assembly (10) further includes a spindle (16) having an elongated cylindrical main body portion (18) which terminates in a relatively flat cylindrical base (20). Turning to FIG. 2 of the drawings, it may be observed that the diameter of main body (18) is less than the diameter of central bore (14) to enable the sinker (12) to slide freely along the outer surface (22) of main body (18). It also may be seen that the diameter of base (20) is somewhat larger than that of spindle bore (14) which prevents the base from passing through the spindle bore (14) when the spindle is in its free state.

In the preferred embodiment of the invention illustrated in FIGS. 1 through 3 spindle (16) in its entirety is constructed of an elastomeric material which may be stretched and which may be deformed when placed in tension as will be described in greater detail hereinbelow.

The releasable sinker assembly (10) of the present invention also provides an attaching means for attaching the sinker (12) in spindle (16) to a fishing line. The attaching means includes a swivel (24) having an eyelet (26) at each end thereof. One eyelet (26) connects the swivel (24) to a fishing line (28) and the other eyelet (26) connects the swivel (24) to the spindle (16) as illustrated in FIG. 3. Referring once again to FIG. 2, it may be observed that a bolt (30) having a threaded outer surface (32) passes successively through the other eyelet (26) of swivel (24), a longitudinally extending central bore (34) of a spacer (36) and through a threaded central bore (38) of an insert (40) captured in an opening (42) at the outer end (44) of spindle (16). In the preferred embodiment of the invention described herein, spacer (36) is made from an aluminum casting and insert (40) is constructed from a piece of brass stock. Additionally, it has been found desirable to thread the central bore (34) of spacer (36) to enable swivel (24) to be securely anchored between the head of bolt (30) and the top of spacer (36) to prevent relative movement therebetween. If the swivel (24) was permitted to rotate between the head of bolt (30) and the top of spacer (36) it could cause bolt (30) to be unscrewed from engagement with insert (40).

Figure 3:
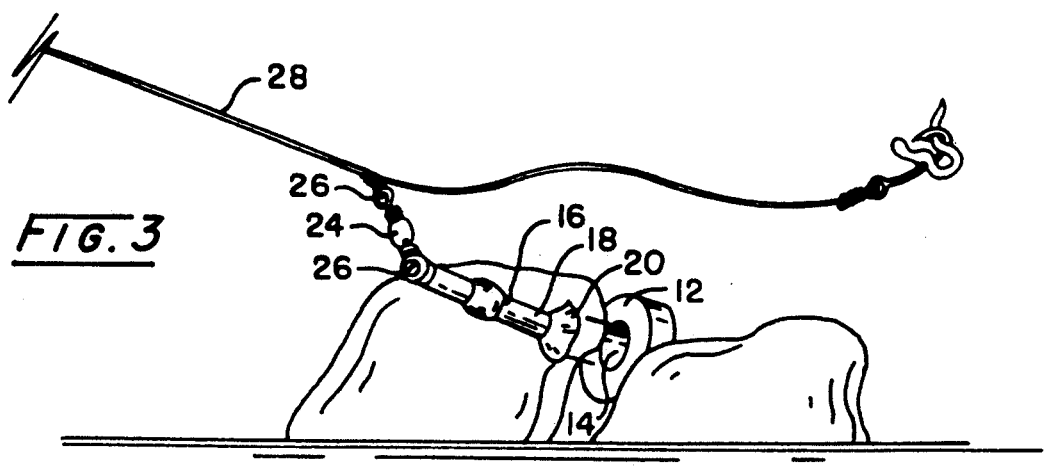
FIG. 3 is a view of the releasable sinker assembly of the present invention attached to a fishing line and illustrating operation of the release mechanism when the sinker is held in place.

Operation of the releasable sinker assembly (10) of the present invention may be seen by referring to FIG. 3. In FIG. 3, sinker (12) is shown wedged between a pair of rocks. Ordinarily, if the fisherman was unable to disengage the sinker (12) from the rocks he would be forced to pull on the fishing line (28) until it broke with an attendant loss of the sinker and the hook or some type of artificial bait not shown.

However, with releasable sinker assembly (10) of the present invention when the sinker becomes lodged on some type of obstruction the fisherman merely pulls the line (28) to place the elastomeric spindle in tension. When sufficient tension is exerted on the line (28) and on the spindle body (16), the base (20) will deform and will enable the main body (16) and base (20) to be pulled through the central bore (14) of the sinker (12). Obviously, the bore (14) and the resilient base (20) of spindle (16) must be sized to enable the base to be deformed and pulled through the opening when the sinker is held in place. However, the elements must be sized in such a way that the tension which must be exerted on spindle (16) to cause base (20) to deform must be less than the amount of tension which would cause the fishing line (28) to break. Once the spindle (16) has been disengaged
} from the sinker (12), a fisherman may reel in his line (28) including the spindle (16), the swivel (24) and whatever hook or artificial bait he has on the end of his line. After the fisherman has retrieved his releasable sinker assembly, he would unscrew the bolt (30) from the insert (40) and place a new sinker (12) over the main body (18) of the spindle (16). Thus, it may be observed that with the releasable sinker assembly (10) of the present invention only the sinker (12) itself is lost if it becomes trapped on rocks or debris below the surface of the water. All of the other fishing tackle will be recovered when the spindle (16) releases from the sinker (12). It has been found that the sinkers (12) may be manufactured at a cost of less than two cents. Accordingly, loss of the sinker (12) is inconsequential compared to the loss of the other tackle on the end of the line and in comparison to any damage which the fisherman's equipment may incur while attempting to dislodge a captured sinker.

Since certain changes may be made in the above-described system and apparatus without departing from the scope of the invention herein involved, it is intended that all matter contained in the description or shown in the accompanying drawings shall be interpreted as illustrative and not in a limiting sense.

We claim:

1. A releasable sinker assembly which comprises:
a sinker having an opening;
a spindle having a main body adapted to extend through the opening in said sinker, an enlarged base at one end of said spindle and attaching means for attaching said spindle to a fishing line at the other end of said main body;
wherein said base is formed of an elastomeric material and is larger than said opening;
wherein said opening and said base are sized such that said base cannot pass freely through said opening when said base is in its free state but that said base may be deformed and pulled through said opening when said sinker is held in place; and
said attaching means has an insert affixed to said other end of said body, a swivel adapted to be connected to a fishing line and a fastener which attaches said swivel to said insert.

2. The releasable sinker assembly of claim 1 in which:
a spacer is mounted on said fastener to space said swivel from the other end of said body.

3. The releasable sinker assembly of claim 2 in which:
said sinker opening is sized to enable said sinker to slide freely along the outer surface of said main body of said spindle and the outer surface of said spacer.

4. The releasable sinker assembly of claim 2 in which:
said spacer has a threaded inner bore; and
said fastener has a threaded outer surface which threadably engages said threaded inner bore.

5. The releasable sinker assembly of claim 4 in which:
said attaching means has an insert affixed to the other end of said body;
said insert had a threaded inner bore; and
said fastener outer surface threadably engages said threaded inner bore of said insert.

6. A releasable sinker assembly which comprises:
a sinker having an opening;
a spindle having a main body adapted to extend through the opening in said sinker, an enlarged base at one end of said main body and attaching means for attaching said spindle to a fishing line at the other end of said main body;
wherein said main body and said base are formed of a deformable, elastomeric material and said base is larger than said opening; and
wherein said opening and said base are sized such that said base cannot pass freely through said opening when said base is in its free state but that said base may be stretched and elongated and said base pulled through said opening when said sinker is held in place; and
said attaching means includes a spacer having one end connected to said body and a swivel connected to the other end of said spacer.

* * * * *